(12) United States Patent
Gieryluk

(10) Patent No.: US 9,353,852 B2
(45) Date of Patent: *May 31, 2016

(54) ACTUATOR COUPLING MECHANISM

(71) Applicant: eAAM Driveline Systems AB, Trollhättan (SE)

(72) Inventor: Henric Gieryluk, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 151 days.

This patent is subject to a terminal disclaimer.

(21) Appl. No.: 14/107,531

(22) Filed: Dec. 16, 2013

(65) Prior Publication Data

US 2015/0166035 A1   Jun. 18, 2015

(51) Int. Cl.
| F16H 59/02 | (2006.01) |
| F16H 48/36 | (2012.01) |
| F16H 48/19 | (2012.01) |
| F16B 7/20  | (2006.01) |
| B60K 6/48  | (2007.10) |
| B60K 6/52  | (2007.10) |
| B60K 1/00  | (2006.01) |
| F16H 63/30 | (2006.01) |

(52) U.S. Cl.
CPC  *F16H 59/02* (2013.01); *B60K 6/48* (2013.01); *B60K 6/52* (2013.01); *F16H 48/36* (2013.01); *B60K 2001/001* (2013.01); *B60K 2006/4841* (2013.01); *B60Y 2400/804* (2013.01); *F16H 2063/3079* (2013.01); *Y02T 10/6221* (2013.01); *Y02T 10/6265* (2013.01); *Y10T 477/6425* (2015.01)

(58) Field of Classification Search
CPC ... F16H 59/02; F16H 48/19; F16H 2048/364; F16H 2048/368; F16H 7/20; F16H 59/042
USPC ........................................................ 475/203
See application file for complete search history.

(56) References Cited

U.S. PATENT DOCUMENTS

| 5,038,884 | A  | * | 8/1991 | Hamada et al. ............... 180/233 |
| 6,024,182 | A  | * | 2/2000 | Hamada et al. .............. 180/6.28 |
| 6,503,167 | B1 | * | 1/2003 | Sturm ........................... 475/231 |
| 8,663,051 | B2 | * | 3/2014 | Sten ............................. 475/205 |
| 8,931,973 | B2 | * | 1/2015 | Olszewski ................... 285/396 |
| 2005/0006164 | A1 | * | 1/2005 | Teraoka ........................ 180/243 |
| 2005/0163559 | A1 | * | 7/2005 | Chang ......................... 403/109.3 |
| 2012/0058855 | A1 |   | 3/2012 | Sten |

* cited by examiner

*Primary Examiner* — Jacob S Scott
*Assistant Examiner* — Tinh Dang
(74) *Attorney, Agent, or Firm* — Harness, Dickey & Pierce, P.L.C.

(57) ABSTRACT

An actuator coupling mechanism (ACM) for an actuator of the type that can be employed in a drive module. The ACM has first and second portions that are coupled in an axial direction by dropping one portion into the other portion such that mating features on the two portions engage one another in a tool-less manner.

20 Claims, 3 Drawing Sheets

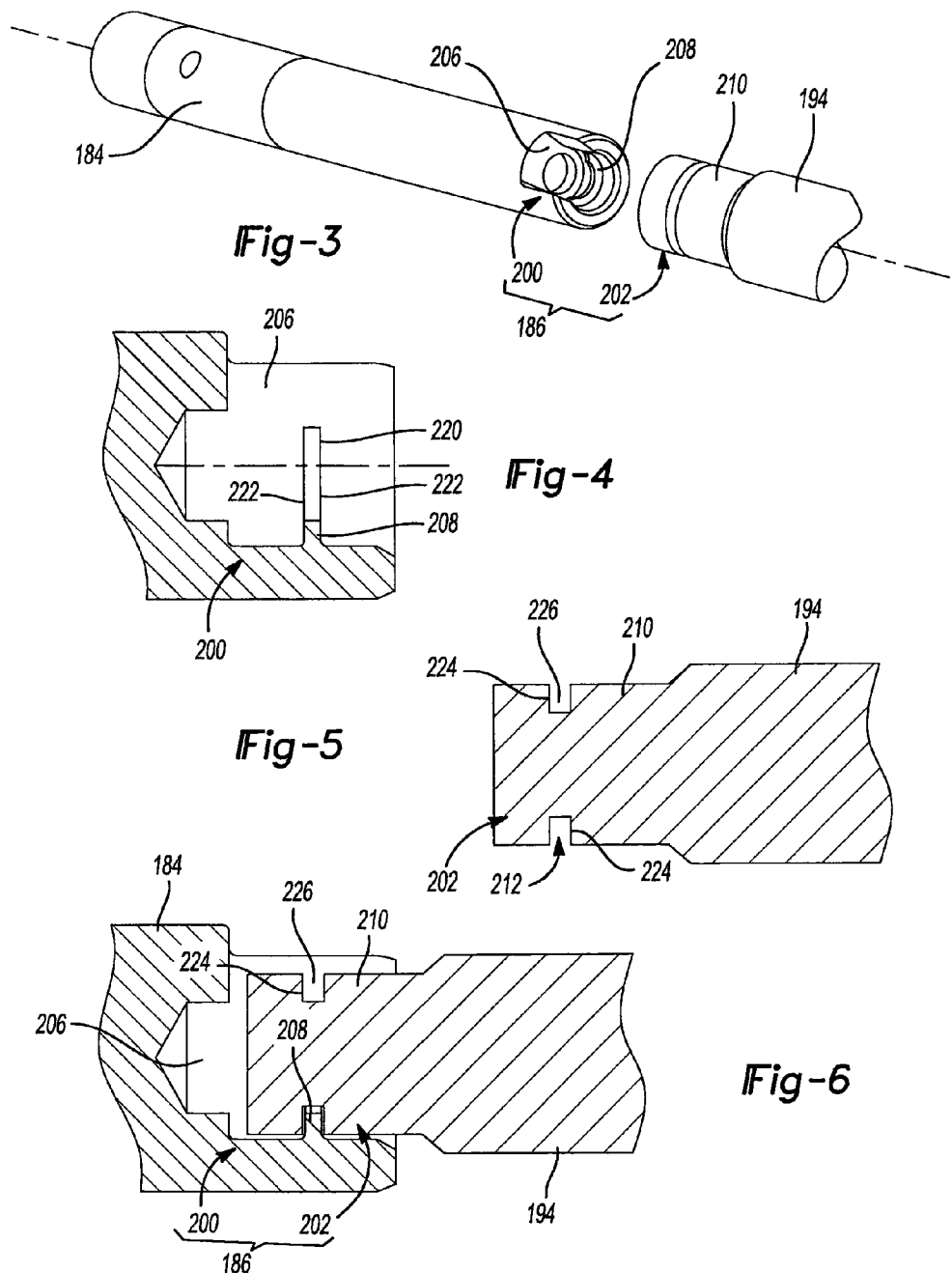

ACTUATOR COUPLING MECHANISM

FIELD

The present disclosure relates to an actuator coupling mechanism.

BACKGROUND

A multi-mode drive module is disclosed in U.S. Patent Application Publication No. 2012/0058855 that can be selectively employed in a propulsion mode, for providing propulsive power to a set of vehicle wheels, and a torque-vectoring mode in which a torque difference is applied to the set of vehicle wheels to improve the stability of a vehicle. In one embodiment, a linear actuator is employed to shift a sleeve via a shift fork between a first position (to operate the drive module in the propulsion mode) and a second position (to operate the drive module in the torque vectoring mode). We have noted that conventional methods for coupling the linear actuator to the shift fork can require substantial disassembly of the drive module to remove the shift fork. While such configurations work for their intended purpose, there remains a need in the art for an improved actuator coupling mechanism.

SUMMARY

This section provides a general summary of the disclosure, and is not a comprehensive disclosure of its full scope or all of its features.

In one form, the present teachings provide a drive module having a motor, a transmission and differential assembly and a mode actuator. The transmission and differential assembly is driven by the output shaft and includes a transmission assembly and a differential assembly. The differential assembly has a differential case, a first differential output and a second differential output. The mode actuator has a shift element, a linear motor and an actuator coupling mechanism. The shift element is translatable between a first position, which causes the transmission and differential assembly to operate in a first mode in which at least one of the first output member, the second output member and the differential case is driven by the motor, and a second position, which causes the transmission and differential assembly to operate in a second, different mode. The actuator coupling mechanism is disposed in a linkage between the shift element and the linear motor and includes a drive lug extending into a U-shaped recess formed in an end of a first rod and a second rod having a circumferentially extending groove formed therein. The second rod is received into the U-shaped recess such that the drive lug is received into the circumferentially extending groove to couple the second rod to the first rod for common axial movement.

In another form, the present teachings provide a drive module that includes a motor, a transmission and differential assembly, and a mode actuator. The transmission and differential assembly is driven by the motor and includes a transmission assembly and a differential assembly. The differential assembly has a differential case, a first differential output and a second differential output. The mode actuator has a shift element, a linear motor and an actuator coupling mechanism. The shift element is translatable between a first position, which causes the transmission and differential assembly to operate in a first mode in which at least one of the first output member, the second output member and the differential case is driven by the motor, and a second position, which causes the transmission and differential assembly to operate in a second, different mode. The actuator coupling mechanism has a first portion, which is coupled to the shift element for translation therewith, and a second portion that is coupled to an output of the linear motor for translation therewith. One of the first and second portions defines a groove into which the other one of the first and second portions is received. The actuator coupling mechanism further includes a pair of mating drive lugs that permit the other one of the first and second portions to be dropped into the one of the first and second portions to couple the shift element to the output of the linear motor in a tool-less manner.

In still another form, the present teachings provide a mode actuator that includes a shift element, a linear motor and an actuator coupling mechanism. The shift element is translatable along a translation axis between a first position and a second position. The linear motor has an output. The actuator coupling mechanism has a first portion, which is coupled to the shift element for translation therewith, and a second portion that is coupled to an output of the linear motor for translation therewith. One of the first and second portions defines a recess into which the other one of the first and second portions is received. The recess extends along the translation axis. The actuator coupling mechanism also includes a pair of mating drive lugs that permit the other one of the first and second portions to be dropped into the one of the first and second portions to couple the shift element to the output of the linear motor in a tool-less manner.

In a further form, the present teachings provide a linkage with a coupling mechanism. The linkage includes first and second rods. The coupling mechanism includes a U-shaped recess formed into an end of the first rod. A drive lug can be coupled to the first rod and can extend into the U-shaped recess. A circumferentially extending groove can be formed into an end of the second rod. The end of the second rod can be received into the U-shaped recess in the end of the first rod such that the drive lug is received into the circumferentially extending groove to couple the second rod to the first rod for common axial movement. In an alternative embodiment, the groove could be formed in the end of the first rod and the drive lug could be coupled to and extend radially outwardly from the second rod.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an exploded perspective view of a portion of the drive module shown in FIG. 1, the view illustrating a portion of a mode actuator;

FIG. 4 is a section view of a portion of the mode actuator taken longitudinally through an end of a fork rod;

FIG. 5 is a section view of a portion of the mode actuator taken longitudinally through an end of a solenoid rod; and FIG. 6 is a section view of a portion of the mode actuator taken longitudinally through the fork rod and the solenoid rod.

Corresponding reference numerals indicate corresponding parts throughout the several views of the drawings.

DETAILED DESCRIPTION

Figure 1:
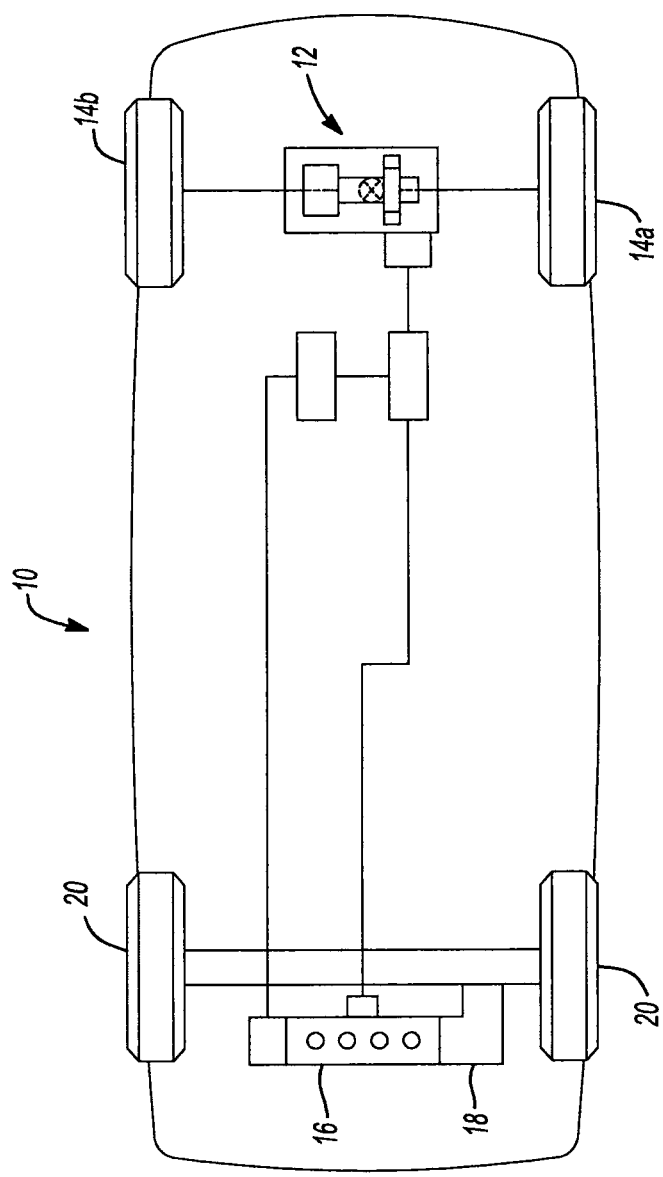
FIG. 1 is a schematic illustration of an exemplary vehicle having a drive module constructed in accordance with the teachings of the present disclosure.

With reference to FIG. 1 of the drawings, an exemplary vehicle 10 is illustrated as having a drive module 12 that is constructed in accordance with the teachings of the present disclosure. The drive module 12 can be employed to drive a pair of vehicle wheels 14a and 14b. In the particular example provided, the drive module 12 is employed to selectively drive the rear vehicle wheels 14a and 14b (i.e., the drive module can be part of a secondary driveline that is operated on a part-time basis), while a conventional internal combustion engine 16 and transmission 18 are employed to drive a set of front vehicle wheels 20 on a full-time basis. It will be appreciated, however, that the teachings of the present disclosure have application to various vehicle configurations and as such, it will be understood that the particular example discussed herein and illustrated in the appended drawings is merely exemplary.

Figure 2:
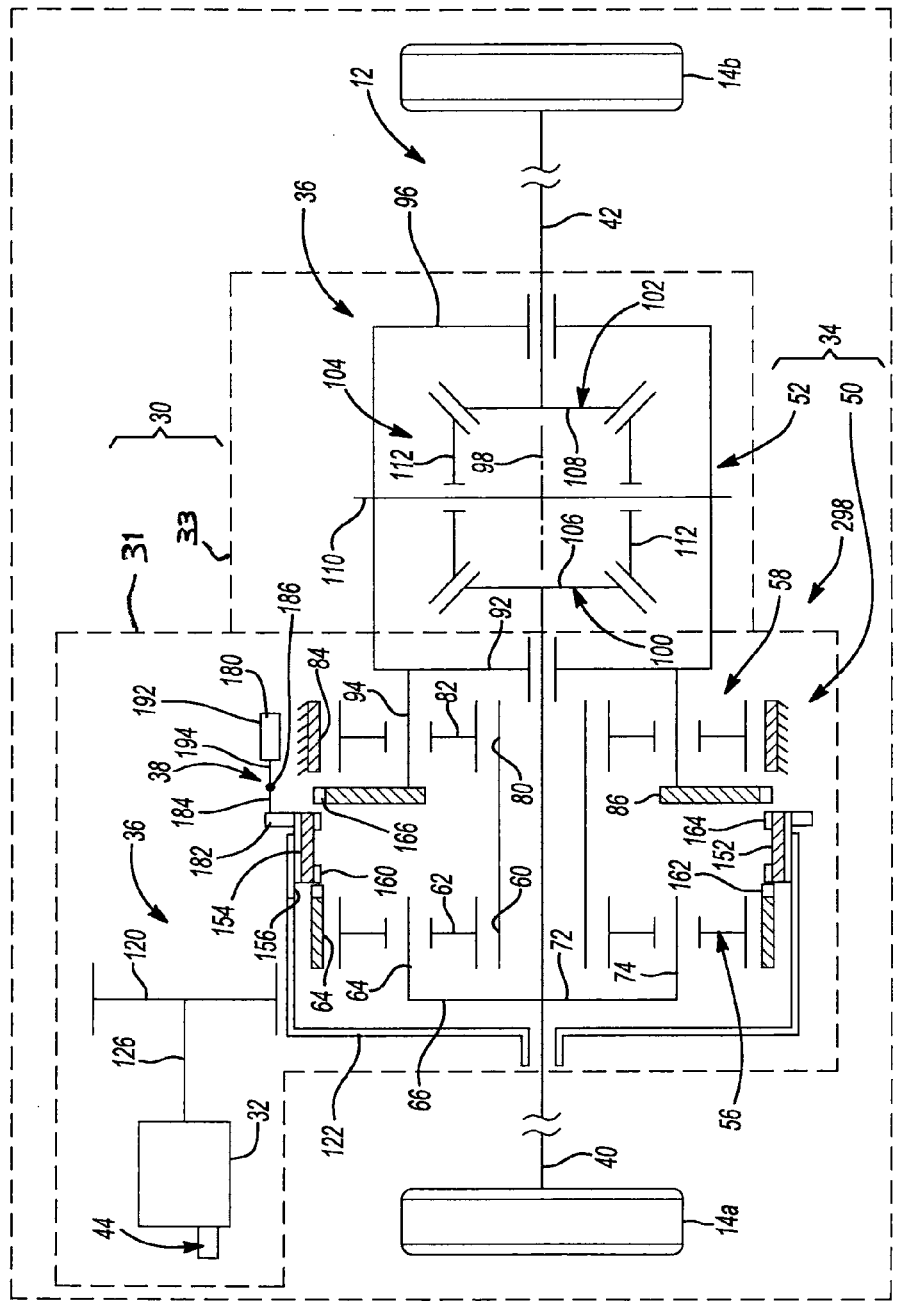
FIG. 2 is a schematic illustration of the drive module shown in FIG. 1.

In FIG. 2, the drive module 12 can include a housing 30, a motor 32, a transmission and differential assembly 34, a reduction drive 36, a mode actuator 38, first and second output members 40 and 42, and a park lock 44. The housing 30 can be configured to house the motor 32 and the transmission and differential assembly 34.

The motor 32 can be any type of device for providing rotary power, such as an electric motor or a hydraulic motor. The motor 32 can be configured to drive the transmission and differential assembly 34 in one or more modes, such as a propulsion mode and/or a torque vectoring mode.

The transmission and differential assembly 34 can be configured to output rotary power to the first and second output members 40 and 42 and can include a transmission assembly 50 and a differential assembly 52. The first and second output members 14a and 14b can transmit rotary power from the transmission and differential assembly 34 to the rear vehicle wheels 14a and 14b, respectively.

The transmission assembly 50 can be co-axially mounted with respect to the first and second output members 40 and 42 and/or a differential assembly 52. The transmission assembly 50 can comprise a first planetary gear set 56 and a second planetary gear set 58. The first and second planetary gear sets 56 and 58 can have identical gear ratios and can be configured such that one or more of the components of the first planetary gear set 56 is/are interchangeable with associated component(s) of the second planetary gear set 58.

The first planetary gear set 56 can comprise a first sun gear 60, a plurality of first planet gears 62, a first ring gear 64, and a first planet carrier 66. The first sun gear 60 can be a generally hollow structure that can be mounted concentrically about the first output member 40. The first planet gears 62 can be spaced circumferentially about the first sun gear 60 such that teeth of the first planet gears 62 meshingly engage teeth of the first sun gear 60. Likewise, the first ring gear 64 can be disposed concentrically about the first planet gears 62 such that the teeth of the first planet gears 62 meshingly engage teeth on the first ring gear 64. In the example provided, the housing 30 can include a transmission housing 31 and a differential housing 33. The first ring gear 64 can be rotatably disposed in the transmission housing 31. The transmission housing 31 can be non-rotatably coupled to the differential housing 33, which houses the differential assembly 52. The first planet carrier 66 can include a first carrier body 72 and a plurality of first pins 74 that can be fixedly coupled to the first carrier body 72. The first carrier body 72 can be coupled to the first output member 40 such that the first carrier body 72 and the first output member 40 co-rotate. Any suitable means may be employed to couple the first carrier body 72 to the first output member 40, including welds and mating teeth or splines. Each of the first pins 74 can be received into an associated one of the first planet gears 62 and can support the associated one of the first planet gears 62 for rotation about a longitudinal axis of the first pin 74.

The second planetary gear set 58 can comprise a second sun gear 80, a plurality of second planet gears 82, a second ring gear 84, and a second planet carrier 86. The second sun gear 80 can be a generally hollow structure that can be mounted concentrically about the first output member 40. The second sun gear 80 can be non-rotatably coupled to the first sun gear 60 (e.g., the first and second sun gears 60 and 80 can be integrally and unitarily formed). The second planet gears 82 can be spaced circumferentially about the second sun gear 80 such that the teeth on the second planet gears 82 meshingly engage teeth of the second sun gear 80. The second ring gear 84 can be disposed concentrically about the second planet gears 82 such that the teeth of the second planet gears 82 meshingly engage teeth on the second ring gear 84. The second ring gear 84 can be non-rotatably coupled to the transmission housing 31. The second planet carrier 86 can include a second carrier body 92 and a plurality of second pins 94 that can be fixedly coupled to the second carrier body 92. The second carrier body 92 can be coupled to a differential housing or case 96 of the differential assembly 52 such that the second carrier body 92 and the differential case 96 co-rotate. Each of the second pins 94 can be received into an associated one of the second planet gears 82 and can support the associated one of the second planet gears 82 for rotation about a longitudinal axis of the second pin 94.

The first and second planetary gear sets 56 and 58 can be co-aligned about a common longitudinal axis 98 (i.e., an axis that can extend through the first and second sun gears 60 and 80) and can be offset from one another axially along the common longitudinal axis 98.

In addition to the differential case 96, the differential assembly 52 can include a means for transmitting rotary power from the differential case 96 to the first and second output members 40 and 42. The rotary power transmitting means can include a first differential output 100 and a second differential output 102. In the particular example provided, the rotary power transmitting means comprises a differential gear set 104 that is housed in the differential case 96 and which has a first side gear 106, a second side gear 108, a cross-pin 110 and a plurality of pinion gears 112. The first and second side gears 106 and 108 can be rotatably disposed about a rotational axis 98 of the differential case 96 and can comprise the first and second differential outputs 100 and 102, respectively. The first output member 40 can be coupled to the first side gear 106 for common rotation, while the second output member 42 can be coupled to the second side gear 108 for common rotation. The cross-pin 110 can be mounted to the differential case 96 generally perpendicular to the rotational axis 98 of the differential case 96. The pinion gears 112 can be rotatably mounted on the cross-pin 110 and meshingly engaged with the first and second side gears 106 and 108.

While the differential assembly 52 has been illustrated as employing bevel pinions and side gears, it will be appreciated that other types of differential mechanisms could be employed, including differential mechanisms that employ helical pinion and side gears or planetary gear sets. Furthermore, it will be appreciated that other means for transmitting rotary power from the differential case 96 to the first and second output members 40 and 42 may be employed in the alternative. For example, one or more clutches (e.g., friction clutches) may be employed to control transmission of rotary power to the first and second output members 40 and 42. As another example, a solid shaft may be employed in lieu of a mechanism that permits speed differentiation between the first and second output members 40 and 42.

The reduction drive 36 can be configured to transmit rotary power between the motor 32 and the first planetary gear set 56. The reduction drive 36 can include a reduction input member 120 and a reduction output member 122. If desired, various gears can be disposed between the reduction input and output members 120 and 122, but in the particular example provided, the reduction input member 120 is meshingly engaged to (and directly drives) the reduction output member 122. The reduction input member 120 can be a pinion that can be coupled to an output shaft 126 of the motor 32 for rotation therewith. The reduction output member 122 can be a ring gear that can be rotatably mounted about the first output member 40 and the first planetary gear set 56.

The mode actuator 38 can include a shift element 152 that can input rotary power to the transmission assembly 50. The shift element 152 can be a sleeve with a toothed exterior surface 154, which can be non-rotatably but axially slidably engaged to a matingly toothed interior surface 156 of the reduction output member 122, a set of first internal teeth 160, which can be selectively engaged to corresponding teeth 162 formed on the first ring gear 64, and a set of second internal teeth 164 that can be selectively engaged to corresponding teeth 166 formed on the second planet carrier 86.

The mode actuator 38 can further include a linear motor 180, a clutch fork 182, a fork rod 184, and an actuator coupling mechanism 186. The linear motor 180 can be any type of linear motor, such as a pneumatic cylinder, a hydraulic cylinder, a ball screw or jack screw. In the particular example provided, the linear motor 180 comprises a solenoid having a solenoid body 192 and a solenoid rod 194. The solenoid body 192 can be fixedly coupled to the housing 30. The solenoid rod 194 is movable in an axial direction. The clutch fork 182 is mounted to the shift element 152 in a conventional manner such that axial movement of the clutch fork 182 causes corresponding axial movement of the shift element 152.

With additional reference to FIGS. 3-6, the actuator coupling mechanism 186 can be a linkage between the shift element 152 and an output of the linear motor 180, such as the solenoid rod 194. For example, the actuator coupling mechanism 186 can couple the solenoid rod 194 to the fork rod 184 and can include a first portion 200 and a second portion 202. The first portion 200 can be coupled to a first one of the fork rod 184 and the solenoid rod 194, while the second portion 202 can be coupled to the other one of the fork rod 184 and the solenoid rod 194. In the example provided, the first portion 200 is coupled to the fork rod 184 and the second portion 202 is coupled to the solenoid rod 194.

The first portion 200 can include a recess 206, which can extend along the longitudinal axis of the fork rod 184 (i.e., an axis along which the fork rod 184 translates), and a drive lug 208 that can be fixed to the fork rod 184 and which can extend into the recess 206. The recess 206 can be sized to receive an end 210 of the solenoid rod 194. The second portion 202 can include a mating drive lug 212 that can be fixedly coupled to the end 210 of the solenoid rod 194 and configured to matingly engage the drive lug 208. More specifically, the mating drive lug 212 is configured to engage the drive lug 208 in a tool-less and positive manner such that the fork rod 184 is coupled to the solenoid rod 194 for axial movement therewith. In the particular example provided, the drive lug 208 comprises a rib 220 that defines a pair of first wall members 222, while the mating drive lug 212 comprises a pair of second wall members 224 that are defined by a groove 226. The rib 220 can extend in a circumferential manner about a portion of the recess 206 and can be oriented generally perpendicular to the longitudinal axis of the fork rod 184. The groove 226 can extend around the circumference of the solenoid rod 194 and can be configured to receive the rib 220 such that the each of the first wall members 222 is abutted against an associated one of the second wall members 224.

The particular configuration depicted for the drive lug 208 and the mating drive lug 212 was chosen for its relative ease of machining and to permit rotation of the solenoid rod 194 relative to the fork rod 184. It will be appreciated, however, that the drive lug 208 and the mating drive lug 212 could be configured differently. For example, one of the drive lug 208 and the mating drive lug 212 could comprise a hole (not shown) and the other one of the drive lug 208 and the mating drive lug 212 could comprise a post (not shown) that can be received into the hole. Configuration in this manner would permit the fork rod 184 to be axially coupled to the solenoid rod 194 but would not permit relative rotation there between.

It will be appreciated that after the second coupling portion is received into the first coupling portion (such that the drive lug 208 is engaged to the mating drive lug 212) that the linear motor 180 can be fixedly secured to the housing 30 such that the longitudinal axis of the solenoid rod 194 is aligned to the longitudinal axis of the fork rod 184. Configuration in this manner permits "drop-in" mounting of the linear motor 80 and does not permit the fork rod 184 to be disengaged from the solenoid rod 194 while the shift fork rod 84 and the solenoid rod 194 are mounted to the housing 30.

The drive module 12 can be operated in a torque vectoring mode in which the shift element 152 is positioned in a first position to couple the reduction output member 122 to the first ring gear 64 (via engagement of the set of first internal teeth 160 to the teeth 162 on the first ring gear 64) such that the reduction output member 122, the shift element 152 and the first ring gear 64 co-rotate. It will be appreciated that the set of second internal teeth 164 are disengaged from the teeth 166 on the second planet carrier 86 when the shift element 152 is in the first position.

When the motor 32 is activated (i.e., when the output shaft 126 of the motor 32 rotates in the example provided), the motor 32, the reduction drive 36 and the shift element 152 can cooperate to apply rotary power to the first ring gear 64 of the first planetary gear set 56. The rotary power received by the first ring gear 64 is transmitted via the first planet gears 62 and the first planet carrier 66 to the first output member 40, while an opposite reaction is applied to the first sun gear 60 such that the first sun gear 60 rotates in a direction that is opposite to the first planet carrier 66. Rotation of the first sun gear 60 causes corresponding rotation of the second sun gear 80 to thereby drive the second planet gears 82. Because the second ring gear 84 is rotationally fixed to the transmission housing 31, rotation of the second planet gears 82 causes rotation of the second planet carrier 86 in a direction that is opposite to the direction of rotation of the first planet carrier 66. Accordingly, the magnitude of the rotary power (i.e., torque) that is transmitted from the second planet carrier 86 to the differential case 96 (and through the differential assembly 52 to the second output member 42) is equal but opposite to the magnitude of the rotary power (i.e., torque) that is transmitted from the first planet carrier 66 to the first output member 40.

Thus, as a result, the torque induced by the motor 32 to the first and second output members 40 and 42, respectively, is counter-directed. Moreover, since the first and second planetary gear sets 56 and 58 are operably coupled via the differential assembly 52, the magnitude of the induced torque at the first and second output members 40 and 42 is substantially equal. For example, if a positively directed torque is transmitted to the first output member 40 (via rotation of the output shaft 126 of the motor 32 in a first rotational direction), an equal negative torque is transmitted to the second output member 42. Similarly, if a negatively directed torque is transmitted to the first output member 40 (via rotation of the output shaft 126 of the motor 32 in a second rotational direction opposite the first rotational direction), an equal positive torque is transmitted to the second output member 42. In other words, the transmission and differential assembly 34 may be employed to generate a torque difference between the first and second differential outputs 100 and 102, which is communicated to the rear vehicle wheels 14a and 14b, respectively, through the first and second output members 40 and 42, respectively.

The drive module 12 can be operated in a drive mode in which the shift element 152 is positioned in a second position to couple the reduction output member 122 to the second planet carrier 86 (via engagement of the set of second internal teeth 164 with the teeth 166 on the second planet carrier 86) such that rotary power provided by the motor 32 is input to differential case 96 and applied to the first and second output members 40 and 42 via the differential assembly 52. It will be appreciated that the set of first internal teeth 160 on the shift element 152 can be disengaged from the teeth 162 on the first ring gear 64 when the shift element 152 is in the second position. It will also be appreciated that rotary power provided by the motor 32 when the transmission and differential assembly 34 is operated in the drive mode is employed for propulsive power to propel (or aid in propelling) the vehicle 10 (FIG. 1).

The drive module 12 can also be placed in a neutral mode in which the shift element 152 can uncouple the reduction output member 122 from both the first ring gear 64 and the second planet carrier 86 such that the reduction output member 122 is decoupled from the first planetary gear set 56, the second planetary gear set 58, and the differential case 96. In the example provided, the shift element 152 can be positioned in a third position between the first and second positions such that the sets of first and second internal teeth 160 and 164 are disposed axially between and disengaged from the teeth 162 on the first ring gear 64 and the teeth 166 on the second planet carrier 86. Accordingly, placement of the shift element 152 in the third position decouples the motor 32 from the first planetary gear set 56, the second planetary gear set 58 and the differential case 96.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
a motor;
a transmission and differential assembly driven by the motor, the transmission and differential assembly having a transmission and a differential, the differential having a differential case, a first differential output and a second differential output; and
a mode actuator having a shift element, a linear motor and an actuator coupling mechanism, the shift element being translatable between a first position, which causes the transmission and differential assembly to operate in a first mode in which at least one of the first output member, the second output member and the differential case is driven by the motor, and a second position, which causes the transmission and differential assembly to operate in a second, different mode, the actuator coupling mechanism being a linkage between the shift element and the linear motor, the actuator coupling mechanism comprising a drive lug extending into a U-shaped recess formed in an end of a first rod, the U-shaped recess extending through a radially outermost surface of the first rod, and a second rod having a circumferentially extending groove formed therein, the second rod being received into the U-shaped recess such that the drive lug is received into the circumferentially extending groove to thereby couple the second rod to the first rod for common axial movement and such that the second rod is translatable in the U-shaped recess in a direction that is transverse to a longitudinal axis of the first rod.

2. The drive module of claim 1, wherein the drive lug comprises a rib having a pair of first walls that are spaced apart from one another.

3. The drive module of claim 2, wherein the groove defines a pair of second walls, each of the first walls abutting an associated one of the second walls.

4. The drive module of claim 1, wherein the linear motor comprises a solenoid.

5. The drive module of claim 1, wherein the shift element comprises a sleeve.

6. The drive module of claim 5, wherein a shift fork is engaged to the sleeve and wherein the actuator coupling mechanism is disposed between the shift fork and the output of the linear motor.

7. The drive module of claim 1, wherein the U-shaped recess extends axially through a terminal end of the first rod.

8. A drive module comprising:
a motor;
a transmission and differential assembly driven by the motor and comprises a transmission and a differential, the differential having a differential case, a first differential output and a second differential output; and
a mode actuator having a shift element, a linear motor and an actuator coupling mechanism, the shift element being translatable between a first position, which causes the transmission and differential assembly to operate in a first mode in which at least one of the first output member, the second output member and the differential case is driven by the motor, and a second position, which causes the transmission and differential assembly to operate in a second, different mode, the actuator coupling mechanism having a first portion and a second portion, one of the first and second portions is coupled to the shift element for axial translation therewith, and the other one of the first and second portions is coupled to an output of the linear motor for axial translation therewith, wherein the first portion defines an aperture into which the second portion is received, the aperture extending through a radially outermost surface of the first portion, and wherein the actuator coupling mechanism further comprises a pair of mating drive lugs that permits the second portion to be translated radially inward, relative to the radially outermost surface, into the aperture of the first portion to thereby couple the shift element to the output of the linear motor in a tool-less manner.

9. The drive module of claim 8, wherein the mating drive lugs comprise a first drive lug and a second drive lug, wherein the first drive lug comprises a rib that is disposed partly about an axis along which the output of the linear motor translates.

10. The drive module of claim 9, wherein the second drive lug is defined by a groove into which the rib of the first drive lug is received.

11. The drive module of claim 10, wherein the groove extends about an entire circumference of the second drive lug.

12. The drive module of claim 8, wherein the shift element is a sleeve.

13. The drive module of claim 12, wherein a shift fork is engaged to the sleeve and wherein the actuator coupling mechanism is disposed between the shift fork and the output of the linear motor.

14. The drive module of claim 8, wherein the aperture extends axially through a terminal end of the first portion, wherein when the second portion is translated radially inward, relative to the radially outermost surface, into the aperture, the second portion also extends axially through the terminal end.

15. An actuator comprising:
    a shift element that is translatable along a translation axis between a first position and a second position;
    a linear motor having an output; and
    an actuator coupling mechanism having a first portion and a second portion, one of the first and second portions is coupled to the shift element for translation therewith, and the other of the first and second portions is coupled to an output of the linear motor for translation therewith, wherein the first portion defines a recess into which the second portion is received by translation of the second portion in a direction that is transverse to the translation axis, the recess extending along the translation axis, and wherein the actuator coupling mechanism further comprises a pair of mating drive lugs that permit the second portion to be translated in the direction that is transverse to the translation axis and into the recess of the first portion to thereby couple the shift element to the output of the linear motor in a tool-less manner.

16. The actuator of claim 15, wherein the mating drive lugs comprise a first drive lug and a second drive lug, wherein the first drive lug comprises a rib that is disposed partly about an axis along which the output of the linear motor translates.

17. The actuator of claim 16, wherein the second drive lug is defined by a groove into which the rib of the first drive lug is received.

18. The actuator of claim 15, wherein the shift element comprises a shift rod.

19. The actuator of claim 18, wherein a shift fork is coupled to the shift rod for translation therewith.

20. The actuator of claim 15, wherein the recess extends axially through a terminal end of the first portion, wherein when the second portion is translated into the recess in the direction that is transverse to the translation axis, the second portion also extends axially through the terminal end.

* * * * *